Patented Sept. 16, 1952

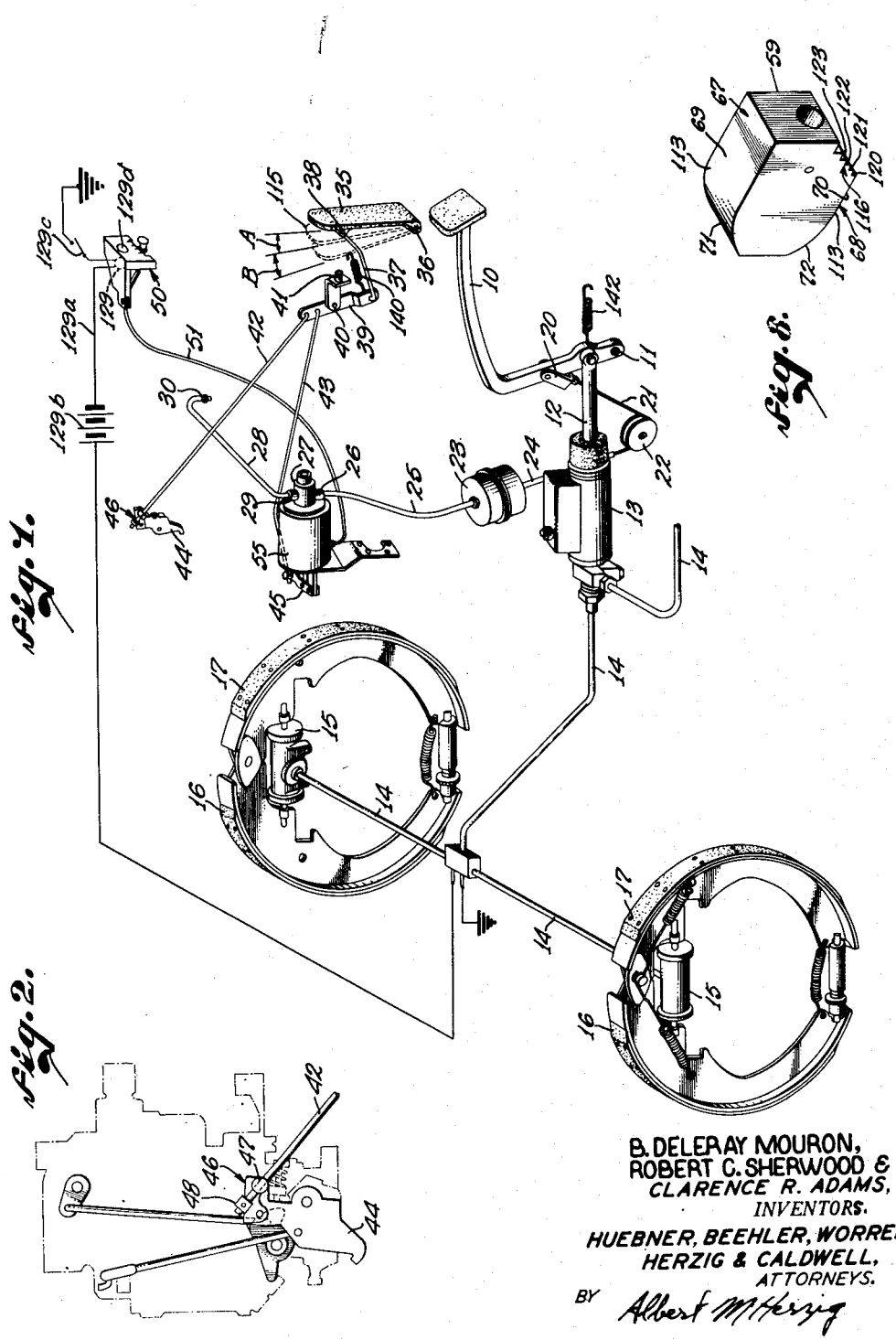

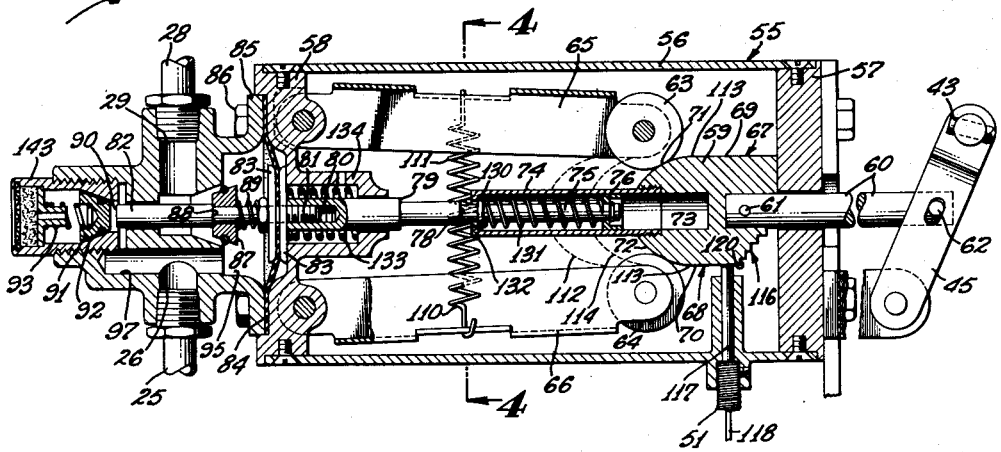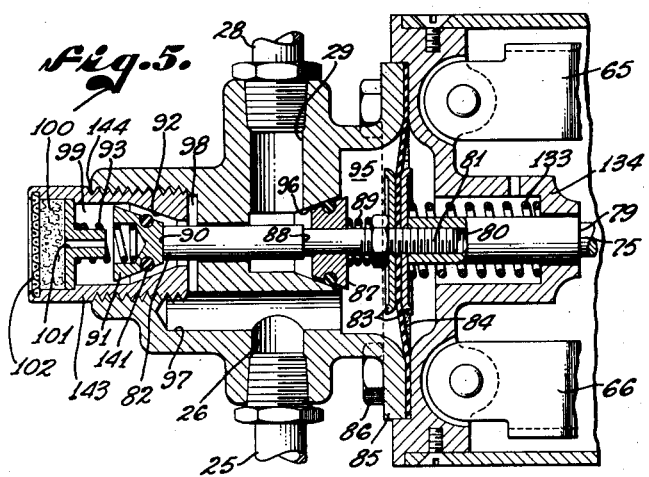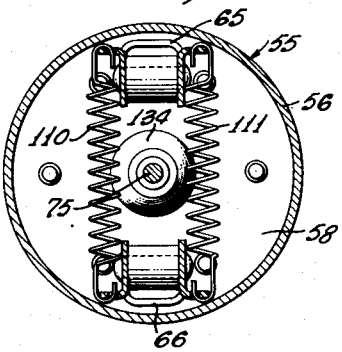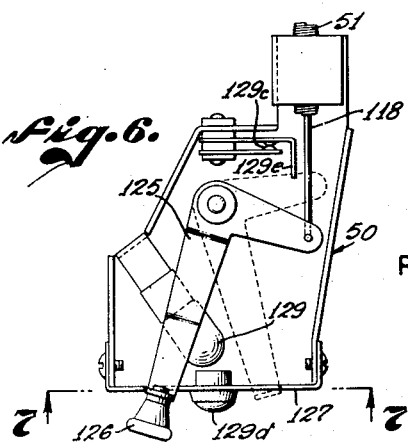

2,610,716

UNITED STATES PATENT OFFICE 2,610,716

ACCELERATOR BRAKE CONTROL

Clarence R. Adams, Montrose, Robert C. Sherwood, West Hollywood, and B. Deleray Mouron, San Marino, Calif., assignors, by mesne assignments, to said Sherwood and said Mouron Application November 14, 1949, Serial No. 127,192

8 Claims. (Cl. 192—3)

This invention relates to automatic brake control and/or clutch control means preferably actuated by the accelerator of a motor vehicle. More specifically it relates to a mechanism associated with the accelerator pedal of a motor vehicle by manipulation of which latter element the brakes of the vehicle may be automatically applied and/or the clutch operated.

This application contains some subject matter common to the co-pending application of G. Allan Cunningham, Arthur C. Walganott, Robert C. Sherwood and Jack C. Urban executed November 8, 1949, and entitled Accelerator Brake Apparatus.

Heretofore braking systems of motor vehicles have been independent of the throttle but the brakes are applied by removing the foot from the accelerator pedal and stepping on the brake pedal while simultaneously operating the clutch, especially where a full stop is made.

Where heavy traffic is encountered and many stops and starts are required the continued necessity of operating the accelerator and the clutch and the brake pedals is fatiguing and in critical situations excessively time-consuming so that collisions are frequent. However, even in areas of relatively small traffic where greater speeds are permissible, an automobile or the like may be stopped or slowed down with much greater facility and far greater speed if the sole operative movement of the driver of the vehicle for accomplishing such purpose is the slight movement of the driver's foot on the accelerator pedal either to release the pedal entirely or to allow it to return towards its initial undepressed condition to the desired extent.

Automatic braking and clutching systems known to the prior art have moreover been tiresome in operation due to the excessive demands of pressure and relatively non-selective movement of the driver's foot for accomplishing the desired results.

It is therefore among the objects of this invention to provide a new and improved automatic braking and/or clutching mechanism for motor vehicles utilizing an intake manifold or other vacuum creating source.

It is another object of this invention to provide a new and improved accelerator construction for the intended purpose described.

Yet another object of the invention is the provision of a new and improved accelerator actuated structure featuring ease of acceleration in the driving range and a positive initial brake releasing and operating movement of the accelerator pedal.

Another object of the invention is the provision of a new and improved balanced yet positive-acting construction between the accelerator pedal and the vacuum-creating manifold.

Another further object of the invention is the provision of a new and improved atmospheric and vacuum valve and port construction.

Another object of the invention is the provision of new and improved selective means under the control of a driver for presetting the braking mechanism whereby the brakes may be applied to a selected maximum extent when the accelerator pedal is fully and optionally instantaneously released.

Among some of the more specific objects of the invention are the provision of novel indicating means cognizable by a driver for indicating whether or to what extent or degree the automatic braking mechanism is on, the provision of novel and improved brake presetting mechanism, the provision of new and improved spring controls, cam controls, valve controls, valve adjusting mechanism and valve operating structure, all associated with ease and positiveness of operation.

It is moreover among the objects of this invention, both specific and general, to provide improvements over prior art devices heretofore intended to accomplish general similar purposes.

With these and other objects in view, the invention consists in the construction, arrangement and combination of the various parts of the device whereby the objects contemplated are attained, as hereinafter set forth, pointed out in the appended claims, and illustrated in the accompanying drawings.

In the drawings:

Figure 1 is a perspective view of selected operative parts of the braking system of an automobile incorporating this invention.

Figure 2 is an elevational view of a carburetor control mechanism including a control rod partially cut away by which said carburetor is connected to the instant invention.

Figure 3 is a vertical sectional view of a valve and control unit exemplifying this invention.

Figure 4 is a vertical sectional view taken as on a line 4—4 of Figure 3.

Figure 5 is an enlarged view of the mechanism illustrated at the left-hand side of Figure 3 showing the parts in a different operative relationship.

Figure 6 is a bottom view of a portion of the selective control mechanism as exemplified in this invention.

Figure 7 is a vertical sectional view taken as on the line 7—7 of Figure 6.

Figure 8 is a perspective view of a cam used in this invention.

Referring more particularly to the drawings, there is illustrated in Figure 1 a hydraulic braking system of an automobile including a brake pedal 10 pivoted as at 11 for actuation of the plunger 12 of a master fluid cylinder 13 which supplies braking fluid under pressure through tubing 14 to the individual brake cylinders 15 associated with the brake members 16 and 17 in a conventional manner for operating the same.

The instant invention may incorporate a yoke 20 pivotally secured to the brake pedal. Said connection may be made to the clutch pedal in a similar manner. A cable 21 may be secured to the yoke 20 and may pass around a pulley 22 and into the diaphragm, not shown, of a booster cylinder 23. A tube 24 may guide the cable 21 into the booster cylinder. A pipe 25 may connect with a booster side 26 of a valve unit 27 and another pipe 28 may also connect with a source of vacuum at 29. The opposite end 30 of the pipe 28 may be connected to the intake manifold or other vacuum-creating system of the automobile.

An accelerator pedal 35 may be pivoted in the usual manner as on a pin 36 in the floor board of the automobile and is provided with a link 37 pivotally secured thereto at 38 and connected with a link 39 pivotally secured on a bracket 40 secured to the underside of the floor board as by a bolt 41. Linkage rods 42 and 43, respectively, connect the link 39 to the carburetion control 44 and control link 45 of the braking unit 27 in a manner to be described.

Control connection between the accelerator pedal through the linkage rod 42 preferably includes a lost motion connection illustrated most clearly in Figures 1 and 2 and there designated at 46. Said rod 42 passes through a pivoted eyelet 47 and is provided with a stop or collar 48 so that when the accelerator pedal 35 passes through an initial angle A, no acceleration occurs, said angle corresponding to the movement measured by the distance between the collar 48 and the eyelet 47. Additional depression of the accelerator pedal through an angle B carries said pedal through the acceleration range for operating the carburetion control in the customary manner. Said initial movement of the accelerator pedal through the angle A, as will be described, likewise moves the linkage rod 43 associated with the breaking unit 27 for operating the mechanism thereof to release or apply the brakes.

A braking selector generally designated at 50 may be connected as by a flexible cable 51 to the braking unit 27 for regulating the amount of braking and presetting said unit for such purpose as will be set forth.

Referring more particularly to the braking unit as illustrated in Figures 3, 4 and 5, there is shown a preferably cylindrical housing 55 having a side wall 56, a rear end wall 57, and a front end wall 58. A cam 59 is axially movable within the cylinder 55 by means of a link 60 to which it may be keyed as at 61. The link 60 is connected to a pin and slot connection 62 to the control link 45 actuated by the linkage rod 43 as heretofore stated.

Cam wheels 63 and 64 rotatable upon opposed arms 65 and 66 are normally urged against the respective surfaces 67 and 68 of the cam, said surfaces being composed of flat portions 69 and 70 and curved portions 71 and 72. The cam adjacent the curved portions 71 and 72 may be formed with a bore 73 into which may be secured as by threading, or otherwise, a tube 74 axially accommodating a plunger rod 75 having a keeper 76 keyed thereto. The rod 75 may be formed with an annular shoulder 78 within the tubing 74 and another shoulder 79 and may be further formed with a threaded bore 80 by which the same may be secured to a threaded end 81 of a shaft 82 whereby diaphragm plates 83 may be sungly positioned against a diaphragm 84 held as between the housing 55 and a housing 85 by any bolts 86 or the like. Slidably fitted upon the shaft 82 is a suction or vacuum valve element 87 normally held against a shoulder 88 formed on the shaft 82 as by a compression spring 89. An end 90 of the shaft 82 is engageable, as illustrated in Figure 5, with an atmospheric valve element 91 normally urged against a seat 92 as by a compression spring 93.

The housing 85 is formed with communicating ports and passageways interconnecting the vacuum ports leading from the pipes 25 and 28, respectively, with a vacuum port 95, a frusto-conical vacuum valve seat 96, a common atmospheric and vacuum bore 97, an annular chamber 98, the frusto-conical atmospheric valve seat 92 and an atmospheric chamber 99. A filter 100 is positioned adjacent an atmospheric port 101 and includes a wire screen or the like 102.

The arms 65 and 66 are normally urged together by means of coil springs 110 and 111 holding the cam wheel 63 and 64 forcibly against the cam surfaces 67 and 68 during the acceleration range, angle B (Figure 1) corresponding, for example, with the dotted outline showing 112. It will be observed that when seated cam wheels are so engaged with the flat parallel surfaces 69 and 70 no axial movement of the cam 59 will be effected by said wheels.

However, during engagement of the cam wheels 63 and 64 with the curved cam surfaces 71 and 72, as will occur during the initial range of pedal movement indicated at angle A of Figure 1, and as set forth in an extreme position of deceleration in solid outline in Figure 3, said cam 59 will be urged to the right. A neutral cam wheel position at points 113 corresponding to an intermediate dotted outline showing 114 in Figure 3 will correspond to a position of the accelerator pedal also illustrated in dotted outline at 115 between the pre-acceleration range A and the acceleration range B.

Thus free acceleration may be had within the acceleration range independent of the influence of the thrust provided by the cam wheels 63 and 64 while said cam 59 will be under said influence of the cam wheels 63 and 64, preferably though not necessarily with increasing force, moving said cam 59 to the right as illustrated in Figure 3, as the extreme position of deceleration is reached by the accelerator pedal.

A stepped construction 116 as seen in Figure 3 is provided on the cam 59 adjacent a finger 117. Said finger is extensible by a wire 118 of the flexible cable 51 associated with the braking regulator 50 for engagement in any selected one of the individual steps, illustrated, by way of example, at 120, 121, 122 and 123. Thereby the amount of axial movement of the cam 59 will be limited.

Thus, if the finger 117 is engaged with the step 120, a lesser limitation of the right-hand movement thereof (Figure 3) under the influence of the cam wheels 63 and 64 would occur than if said figure were engaged, respectively, with steps 121, 122, 123 or 124.

Said selective extension of the finger 118 may be occasioned, as illustrated most clearly in Figures 6 and 7, by the pivotal movement of an L-shaped link 125 having a handle 126 which projects beyond a plate 127 optionally marked with "dry," "wet," "ice" and "off" positions intended to designate, respectively, the desired condition of the braking unit when the same is most strongly operative (as it would be if the finger were disengaged from any step) or the desired condition thereof if the streets were dry, wet, or covered with ice. Obviously the greatest amount of braking would be desired under dry conditions, but said designations and the conditions for which the braking system may be set are not to be regarded as limiting for any desired number of steps or amount of braking may be achieved regardless of the condition of the terrain and depending upon the desired and idiosyncrasies of the operator by a screw type, inclined step or other more gradual control arrangement.

A lamp 129 may be connected by a circuit 129a to a battery 129b so that when a switch 129c is closed the lamp 129 is illuminated and is visible through a colored button 129d. The movement of the L-shaped link 125 to a dotted line position illustrated in Figure 6 corresponding with the "off" position of the braking unit opens the switch 129c by engagement of the link 125 with an arm 129e attached to one of the blades of the switch, extinguishing the lamp.

Within the tube 74 and preferably engageable against the keeper 76 and the shoulder 78, the latter also having a keeper 130, is a coil or cushion spring 131 normally urging the keeper 130 against the shoulder 78, said keeper being also engageable against an end 132 of the tube. Another coil or diaphragm-retracting spring 133 is confined within a portion 134 of the housing 55 and normally urges the diaphragm 84 to the left as illustrated in Figures 3 and 4, thereby opposing the cushion spring 131 which, however, is normally of greater strength than said diaphragm-retracting spring. Thereby the shaft 82 is normally held at an extreme of left-hand movement most clearly illustrated in Figure 3 wherein the keeper 130 is held against the end 132 of the tube. In an optional construction the keeper 130 may be eliminated as may the shoulder 78 in which case the cushion spring 131 would have a normal length in its uncompressed condition equivalent to the distance between the keeper 76 and the illustrated location of the keeper 130.

The springs 110 and 111 are sufficiently strong to overcome the cushion spring 131 when the cam wheels 63 and 64 ride over the curved cam surfaces 71 and 72 so that when the accelerator pedal is released by the driver, the normal condition of the parts is as illustrated in Figure 3, wherein, assuming the braking unit would be operative, the cam 59 is at an extreme of right-hand movement thus overcoming cushioning spring 131 which in turn overcomes the diaphragm retracting spring 133, permitting the atmospheric valve element 91 to seat and lifting the vacuum valve element 87 from its seat 96. A vacuum from the manifold of the automobile thereby acts upon the booster 23 connected with the brake 10 to operate the brake and/or clutch (not shown).

Operation

In the operation of this invention a driver of the automobile is seated in his customary position with his foot upon the accelerator pedal 35. If the automobile motor is running or a vacuum is otherwise created in the carburetor intake manifold and the pipe 28, the accelerator pedal then being in its extreme position of deceleration as illustrated in solid outline in Figure 1, a customary accelerator spring 140 or other conventional springs associated with the carburetor will move the cam 59 to an extreme of right-hand movement as illustrated in Figure 3. Such movement will be transmitted by way of the several links 37, 39, 43, 45 and 60. The cam 59 will be at its extreme of right-hand movement, as illustrated in Figure 3. The cam wheels 63 and 64 will bear against the curved surfaces 71 and 72 under the influence of the coil springs 110 and 111. The cushioning spring 131 will be slightly compressed by the greater force of said springs 110 and 111 due to the extreme right-hand position of the cam 59. The diaphragm retracting spring 133 will be likewise compressed to some extent due to the greater force of the cushion spring 131. The diaphragm 84 will be held to an extreme of right-hand movement as likewise illustrated in Figure 3. Said positions of the parts brings the shaft 82 to an extreme of right-hand movement so that its shoulder 88 engages the vacuum valve element 87 to open the vacuum valve port 29 permitting the same to communicate freely with the vacuum chamber 59, the common bore 97 and the pipe 25 leading to the booster 23. The booster diaphragm, not shown, will be drawn under the influence of the vacuum upwardly as represented in Figure 1 depressing the brake pedal 10 through the cable 21. Said depression of the brake pedal acting upon the master fluid cylinder 13 operates the brakes in a conventional manner. The brakes will be held in operated position so long as a vacuum is maintained in the vacuum chamber 95.

If the automobile is then to be operated the driver places the gears in mesh through the customary transmission, whether hydraulic or mechanical. If the booster 23 or another separate booster similarly connected with the pipe 25 or an off-shoot thereof is connected to a clutch pedal of the automobile in a similar manner to its connection to the brake pedal, the clutch will be held in depressed position similarly to the brake. Therefore, the driver will merely shift gears. Then he will depress the accelerator pedal 35 to the position 115 illustrated in dotted outline in Figure 1 which will serve through the linkages aforesaid to move the cam 59 to the position 114, illustrated in dotted outline in Figure 3. In such position the cam wheels 63 and 64 will rest against the cam surfaces 67 and 68 at the points 113 between the curved cam surfaces 71 and 72 and the parallel cam surfaces 69 and 70. In such position the rod 75 is freed for movement within the bore 73 of the cam in the range of acceleration of the accelerator pedal 35.

When the accelerator pedal is depressed through the acceleration range indicated by the angle B of Figure 1, the cam wheels 63 and 64 ride freely over the cam surfaces 69 and 70 and provide no axial thrust by virtue of their springs 110 and 111. In said driving range the braking unit 27 is inoperative to apply the brakes and the position of the valve parts are as illustrated in Figure 5. The cam in such position is as noted in dotted outline at 112 in Figure 3. Referring in particular to Figure 5 the shaft 82 is moved to the extreme of its left-hand movement by the diaphragm retracting spring 133 inasmuch as the cushioning spring 131 no longer counter-balances said spring as heretofore noted due to the movement of the tube 74 and its end abutment 132 to the left and away from the influence of said spring 131. Said leftward movement of the shaft 82 frees the vacuum valve element 87 which then seats under the influence of its spring 89 against the frusto-conical bore 96. For such purpose the vacuum valve element like the atmospheric valve element 91 is provided with an O-ring 141 of preferred circular cross-section. The end 90 of the shaft 82 engages in its leftward movement the atmospheric valve element 91 lifting the same from its seat against the frusto-conical bore 92 permitting air from the atmosphere to enter the system through the filter 100, bore 101, chamber 98, common bore 97 and pipe 25, thereby relieving the vacuum in the booster 23 and permitting the brake to release to its conventional coil spring 142.

It will thus be seen that movement of the shaft 82 to the left to unseat the atmospheric valve occurs substantially simultaneously with the seating of the vacuum valve element 87 and the converse movement of said shaft 82 to the right permits the seating of the atmospheric valve and unseats the vacuum valve actuating the booster 23 to operate the brakes and/or clutch.

A delicate balance is thus achieved between the atmospheric and vacuum valve depending of course upon their diameters and the total flow permissible past them in their fully opened as well as their partially opened positions. A movement in valves of a diameter approximately corresponding to that illustrated in Figure 5 might not exceed 5 to $15/1000$ of an inch between the operative fully opened or fully closed positions thereof. If greater axial movement of the shaft 82 is not desired during fully opened and fully closed positions of said valves, manufacturing tolerances in the valves and their seats will remain high. Applicant has met the need for slight movement in the shaft 82 coupled with economical construction in the associated valve by the provision of his O-rings 141 and the otherwise tapered valve and seat construction.

Moreover, it has been found possible to achieve a desired degree of accuracy within a few thousandths of an inch by providing a separate threaded housing 143 making threaded connection with the housing 85. The amount of axial threaded movement of the housing 143 within the housing 85 establishes the relative closed and open limits of the exhaust and atmospheric valves. When the optimum position of the housing 143 is obtained and adjusted for the braking unit in question, the housing adjacent threads 144 may be peened or spiked, thereby retaining the two housings 143 and 85 in such adjusted position.

If the threaded housing 143 is adjusted too far to the right, insufficient clearance will be left between the shaft 82 and the atmospheric valve. Involuntary movement of the shaft has in such circumstances been found to occur resulting in a "galloping" of the automobile. On the other hand, if the clearance between the atmospheric valve and the shaft is set at too great a value, a gradual leakage of the vacuum valve has been found to occur.

Adequate brake control is possible in any range of shaft movement which serves to open the atmospheric valve while closing the vacuum valve and vice versa. Preferably one valve should close at the same stage of shaft movement at which the other opens. Or, the shaft may be of such a length or equivalent structure provided permitting both valves to be slightly open simultaneously. In any event, it is desirable that the rapidity of movement of the shaft when compared with the corresponding flow permissible through the valve control ports gives some control to the driver of the automobile. Therefore, it is to be desired that a slight movement of the accelerator pedal 35 in the braking range designated by the angle A give corresponding slight fractional values of the total possible braking power for any setting of the braking regulator.

Said rapidity of stoppage is, in addition, dependent upon the setting of the braking regulator whose function is to establish the maximum speed and intensity at which braking can occur when the accelerator is instantaneously released. Such maximum is established by control of the maximum opening of the vacuum valve at any particular setting of the regulator.

It is also possible to obtain any desired amount of opposing accelerator pressure by tapering the otherwise parallel cam surfaces 69 and 70 slightly, say five to ten thousandths of an inch per inch. While it is desirable to obtain rapid, positive valve action, the cushioning and more or less delicate balance of acting forces, contributes to smooth, non-jarring valve operation and adds to driving safety and enjoyment.

A coil compression spring (not shown) may be interposed between the housing 134 and the cam 59. Such a spring, if used, may encircle the shaft between said elements normally urging them apart but with lesser tension than either the spring 131 or 133. Such a spring tends to cushion any tendency towards slamming action of the wheels 63 and 64 due to the shift of their applicable direction of thrust in rolling over the curved cam surfaces 71 and 72 and/or due to the pick-up of the spring 171 by the sleeve 74 during said right-hand movement of the cam 59. Probably such cushioning effect is occasioned by the tendency of the described spring to urge the throttle 35 towards a position of deceleration which is ordinarily opposed by the foot of the operator.

This invention features the provision of a new and improved automatic accelerator braking unit having a new and improved operative and structural relationship between the effective braking range of the accelerator pedal and the free driving range thereof. It also features the provision of a new and improved atmospheric and vacuum valve construction, a new and improved adjustable relationship between the atmospheric valve and its operating mechanism and therefore also between the atmospheric valve and the vacuum valve in the event two such valves are provided. Likewise featured is the manipulative pre-set mechanism under the control of a driver for adjusting the operation of the brakes to variant weather conditions, driving conditions or personal preferences of the driver.

While the above description refers to a vacuum-operated system, it is also possible through adaptations well known to those skilled in the art of braking systems to modify the instant invention for operation by pressurized means.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what we claim as new and desire to secure by Letters Patent is:

1. In a motor vehicle, a vacuum energized braking system, a vacuum manifold, a pipe connecting the vacuum manifold with the braking system, a braking valve unit comprising a housing interposed in said pipe and including adjustable linkage for a controlled application of vacuum to the braking system, an engine throttle valve lever for controlling said linkage, means yieldably retaining the throttle valve lever at its closed position, said linkage including a lost motion connection, said throttle valve lever being under the control of a driver adapted to be moved through an initial interval of travel for actuation of said braking valve unit progressively from an operative open to an inoperative closed position without the actuation of the throttle lever and including a second lost motion connection adapted to be actuated through an additional interval for normal functional actuation of the throttle control lever while the brake control valve remains closed, the improvement residing in: said second lost motion connection in said braking valve unit comprising a shaft axially movable in said braking valve unit under the influence of said throttle lever, valve means controlling said vacuum engageable by said shaft for controlling said valve means, a cam connected to said shaft and movable therewith, a number of cam followers mounted in said braking valve unit normally spring-urged laterally against said cam, said cam having a number of inclined surfaces against which said cam followers ride in a manner to urge the cam in an axial direction to assist said means yieldably retaining the throttle valve lever at its closed position for resisting normal engine throttling movement of said lever through said linkage during said initial interval of travel of said throttle valve lever, said cam being formed with an abutment, manipulative means under the control of a driver including extensible means engageable against said abutment to limit the axial movement of said cam and said shaft.

2. In a motor vehicle, a vacuum energized braking system, a vacuum manifold, a pipe connecting the vacuum manifold with the braking system, a braking valve unit comprising a housing interposed in said pipe and including adjustable linkage for a controlled application of vacuum to the braking system, an engine throttle valve lever for controlling said linkage, means yieldably retaining the throttle valve lever at its closed position, said linkage including a lost motion connection, said throttle valve lever being under the control of a driver adapted to be moved through an initial interval of travel for actuation of said braking valve unit progressively from an operative open to an inoperative closed position without the actuation of the throttle lever and including a second lost motion connection adapted to be actuated through an additional interval for normal functional actuation of the throttle control lever while the brake control valve remains closed, the improvement residing in: said second lost motion connection in said braking valve unit comprising a shaft axially movable in said braking valve unit under the influence of said throttle lever, valve means controlling said vacuum engageable by said shaft for controlling said valve means, a cam connected to said shaft and movable therewith, a number of cam followers mounted in said braking valve unit normally spring-urged laterally against said cam, said cam having a number of inclined surfaces against which said cam followers ride in a manner to urge the cam in an axial direction to assist said means yieldably retaining the throttle valve lever at its closed position for resisting normal engine throttling movement of said lever through said linkage during said initial interval of travel of said throttle valve lever, said cam being formed with an abutment, manipulative means under the control of a driver including extensible means engageable against said abutment to limit the axial movement of said cam and said shaft, said abutment comprising a series of graduated steps, said extensible means including a pivoted L-shaped link having a handle, said extensible means being selectively engageable in any of said steps.

3. In a motor vehicle, a vacuum energized braking system, a vacuum manifold, a pipe connecting the vacuum manifold with the braking system, a braking valve unit comprising a housing and valve means interposed in said pipe, adjustable linkage for a controlled application of vacuum to the braking system, an engine throttle valve lever for controlling said linkage, means yieldably retaining the throttle valve lever at its closed position said linkage including a first lost motion connection, said throttle valve lever being adapted to be moved under the control of a driver through an initial interval of travel for actuation of said braking valve means progressively from an operative to an inoperative position without the actuation of the throttle lever due to said first lost motion connection, said braking valve unit including a second lost motion connection adapted to be moved through an additional interval for normal functional actuation of the throttle control lever while the brake control valve means remains inoperative, the improvement residing in: said second lost motion connection comprising a valve control shaft axially movable in said braking valve unit under the influence of said throttle lever and linkage, said valve means being engageable by said shaft for controlling said valve means, a cam associated with said shaft and movable therewith, a number of cam followers mounted in said braking valve unit including spring means by which said cam followers are normally urged laterally against said cam, said cam having a number of cam surfaces inclined relative to the axis of said shaft and against which said cam followers ride in a manner to urge the cam and shaft in an axial direction to operate said braking valve means and for opposing normal engine throttling movement of said lever through said linkage during said initial interval of travel of said throttle valve lever, said shaft being operative at one limit of axial movement to operate said braking valve means and being operative at an opposite limit of axial movement to render said braking means inoperative, said shaft being formed with a tubular portion secured to said cam and a free portion engageable with said valve means, a non-valve engaging end of said free portion being telescoped within the tubular portion, shoulders formed at the outer end of the tubular portion and the non-valve engaging end of the free portion, a spring cushion of lesser length than the tubular portion disposed between said shoulders and operative at said extreme valve operating position of the shaft to yieldably operate said valve means, said spring cushion being inoperative in said inoperative position of the shaft thereby providing a free overrunning connection between the tubular and free portions of said shaft.

4. In a motor vehicle, a vacuum energized braking system, a vacuum manifold, a pipe connecting the vacuum manifold with the braking system, a braking valve unit comprising a housing interposed in said pipe and including adjustable linkage for a controlled application of vacuum to the braking system, an engine throttle valve lever for controlling said linkage, means yieldably retaining the throttle valve lever at its closed position, said linkage including a lost motion connection, said throttle valve lever being under the control of a driver adapted to be moved through an initial interval of travel for actuation of said braking valve unit progressively from an operative open to an inoperative closed position without the actuation of the throttle lever and including a second lost motion connection adapted to be actuated through an additional interval for normal functional actuation of the throttle control lever while the brake control valve remains closed, the improvement residing in: said second lost motion connection in said braking valve unit comprising a shaft axially movable in said braking valve unit under the influence of said throttle lever, valve means controlling said vacuum engageable by said shaft for controlling said valve means, a cam connected to said shaft and movable therewith, a number of cam followers mounted in said braking valve unit normally spring-urged laterally against said cam, said cam having a number of inclined surfaces against which said cam followers ride in a manner to urge the cam in an axial direction to assist said means yieldably retaining the throttle valve lever at its closed position for resisting normal engine throttling movement of said lever through said linkage during said initial interval of travel of said throttle valve lever, said shaft having a free end portion engageable with said valve means, a limited action cushioning spring connection between said end portion and the remainder of said shaft normally urging said end portion at an extreme of extension of said shaft in a direction to actuate said valve means for operating the braking system, a retracting spring connected to said end portion of said shaft and engageable with a portion of the braking valve unit normally opposing but of lesser strength than said cushioning spring.

5. In a motor vehicle, a vacuum energized braking system, a vacuum manifold, a pipe connecting the vacuum manifold with the braking system, a braking valve unit comprising a housing interposed in said pipe and including adjustable linkage for a controlled application of vacuum to the braking system, an engine throttle valve lever for controlling said linkage, means yieldably retaining the throttle valve lever at its closed position, said linkage including a lost motion connection, said throttle valve lever being under the control of a driver adapted to be moved through an initial interval of travel for actuation of said braking valve unit progressively from an operative open to an inoperative closed position without the actuation of the throttle lever and including a second lost motion connection adapted to be actuated through an additional interval for normal functional actuation of the throttle control lever while the brake control valve remains closed, the improvement residing in: said second lost motion connection in said braking valve unit comprising a shaft axially movable in said braking valve unit under the influence of said throttle lever, valve means controlling said vacuum engageable by said shaft for controlling said valve means, a cam connected to said shaft and movable therewith, a number of cam followers mounted in said braking valve unit normally spring-urged laterally against said cam, said cam having a number of inclined surfaces against which said cam followers ride in a manner to urge the cam in an axial direction to assist said means yieldably retaining the throttle valve lever at its closed position for resisting normal engine throttling movement of said lever through said linkage during said initial interval of travel of said throttle valve lever, said valve means comprising distinct frustro-conical atmospheric and vacuum valve elements having O-type sealing rings extending from their conical surfaces, said housing being formed with frustro-conical bores respectively associated with and adapted to receive said frustro-conical valve elements in sealable relationship, said shaft being adapted to abut said valve elements to open and close the same alternately in opposite limits of its said axial movement, said shaft having a lost motion interval with respect to one of said valve elements in an intermediate position of said shaft when said atmospheric valve element is closed while said vacuum valve element is only partially opened.

6. In a motor vehicle, a vacuum energized braking system, a vacuum manifold, a pipe connecting the vacuum manifold with the braking system, a braking valve unit comprising a housing interposed in said pipe and including adjustable linkage for a controlled application of vacuum to the braking system, an engine throttle valve lever for controlling said linkage, means yieldably retaining the throttle valve lever at its closed position, said linkage including a lost motion connection, said throttle valve lever being under the control of a driver adapted to be moved through an initial interval of travel for actuation of said braking valve unit progressively from an operative open to an inoperative closed position without the actuation of the throttle lever and including a second lost motion connection adapted to be actuated through an additional interval for normal functional actuation of the throttle control lever while the brake control valve remains closed, the improvement residing in: said second lost motion connection in said braking valve unit comprising a shaft axially movable in said braking valve unit under the influence of said throttle lever, valve means controlling said vacuum engageable by said shaft for controlling said valve means, a cam connected to said shaft and movable therewith, a number of cam followers mounted in said braking valve unit normally spring-urged laterally against said cam, said cam having a number of inclined surfaces against which said cam followers ride in a manner to urge the cam in an axial direction to assist said means yieldably retaining the throttle valve lever at its closed position for resisting normal engine throttling movement of said lever through said linkage during said initial interval of travel of said throttle valve lever, said valve means comprising distinct frustro-conical atmospheric and vacuum valve elements having O-type rings secured in their conical surfaces, said housing being formed with frustro-conical bores respectively associated with and adapted to receive said frustro-conical valve elements in sealable relationship, said valve elements and said frustro-conical bore portions being arranged in alignment, said shaft axially extensible through said bores and having an end abutment engageable with the smaller end of one of said frustro-conical valve elements in one reciprocative movement of the shaft for lifting said element from its frustro-conical bore, a portion of said shaft being axially slidable through another of said valve elements and having a shoulder engageable with the smaller end of said vacuum valve element for lifting the same from its frustro-conical bore in an opposite reciprocative movement of said shaft, springs between said housing and said atmospheric and vacuum valve elements respectively urging said elements sealably into their respective frustro-conical bores.

7. A braking valve unit as characterized in claim 6 in which a separate housing is threadably secured to said braking unit housing and one of said bores being formed in said separate housing whereby the axial distance between said bores may be adjusted to regulate the open and closed positions of said valves with respect to one another and with respect to the valve-element engaging parts of said shaft.

8. In an automatic brake control apparatus for motor vehicles as characterized in claim 14, a control lever in said control device, said lever being movably mounted, an electrical signalling means including a lamp visible to the operator, a source of electrical energy, an electrical conductor including a switch controlled by the movement of said lever whereby said lamp is illuminated in a position corresponding to an "on-position" of the automatic brake apparatus, said apparatus having an "off-position" at an extreme of lever movement wherein said extensible means engages said valve element to prevent opening of said conduit means, and a spring connection yieldable under the influence of the foot pedal linkage connection with said valve device in the off-position of said lever whereby continued operation of said foot pedal is permitted in said off-position.

CLARENCE R. ADAMS.
ROBERT C. SHERWOOD.
B. DELERAY MOURON.

REFERENCES CITED

The following references are of record in the file of this patent:

UNITED STATES PATENTS

| Number | Name | Date |
| --- | --- | --- |
| 1,824,050 | Joers | Sept. 22, 1931 |
| 2,087,305 | Schmitt | July 20, 1937 |
| 2,152,060 | Kliesrath | Mar. 28, 1939 |
| 2,207,041 | Vau | July 8, 1940 |
| 2,325,771 | Hemphill | Aug. 3, 1943 |